United States Patent [19]
Fell

[11] Patent Number: 5,877,997
[45] Date of Patent: Mar. 2, 1999

[54] PULSE ECHO DISTANCE MEASUREMENT

[75] Inventor: Roger Fell, Skipton, United Kingdom

[73] Assignee: Croma Developments Limited, Skipton, United Kingdom

[21] Appl. No.: 875,490

[22] PCT Filed: Feb. 1, 1996

[86] PCT No.: PCT/GB96/00236

§ 371 Date: Jul. 31, 1997

§ 102(e) Date: Jul. 31, 1997

[87] PCT Pub. No.: WO96/24027

PCT Pub. Date: Aug. 8, 1996

[30]     Foreign Application Priority Data

Feb. 2, 1995 [GB] United Kingdom ................... 9502087

[51] Int. Cl.⁶ .......................... G01S 15/10; G01S 7/527; G01F 23/296
[52] U.S. Cl. ................................ 367/99; 367/908; 73/290
[58] Field of Search .................... 367/99, 908; 73/290 V

[56]             References Cited

U.S. PATENT DOCUMENTS

| 4,992,998 | 2/1991 | Woodward | 367/99 |
| 5,587,969 | 12/1996 | Kroemer et al. | 367/99 |

FOREIGN PATENT DOCUMENTS

| 0 013 616 | 7/1980 | European Pat. Off. . |
| 0 295 893 A3 | 12/1988 | European Pat. Off. . |
| 0 295 893A2 | 12/1988 | European Pat. Off. . |
| 0 340 953 | 11/1989 | European Pat. Off. . |
| 42 04 414 | 6/1993 | Germany . |
| 42 30 626 A1 | 3/1994 | Germany . |

OTHER PUBLICATIONS

International Publication No. WO93/09409 published May 13, 1993.

International Publication No. WO92/14996 published Sep. 3, 1992.

*Primary Examiner*—Ian J. Lobo
*Attorney, Agent, or Firm*—Nikaido Marmelstein Murray & Oram, LLP

[57]           ABSTRACT

The invention concerns pulse echo distance measurement and in particular a method and apparatus for calculating such a distance by sensing multiple reflections of a given pulse signal. By sensing multiple reflections, and not just the primary echo, internal time delays which would otherwise cause systematic errors may be simply eliminated and the multiple readings obtained may be utilized to provide system self-diagnostic checks, eliminate spurious information and provide an accurate measure of distance. A particular advantage of the method is that very small distances between sensor and target may be measured.

10 Claims, 5 Drawing Sheets

PULSE ECHO DISTANCE MEASUREMENT

BACKGROUND OF THE INVENTION

1. Field of the Invention

The invention relates to an improved method and apparatus for use in pulse echo distance measurement.

2. Description of the Related Art

Pulse echo methods are well known for use in distance measuring. In such methods a pulse of radiation is transmitted towards a target, reflected at the target, and received by a sensor and the time elapsed between transmission and the time when the first or primary echo is received from the target is measured. Multiplying this travel time by the pulse propagation velocity gives twice the distance to the target. Types of radiation commonly used are electromagnetic radiation (radar), optical radiation (lidar) or acoustics (sonar). The target may be a solid object whose position is to be pinpointed or the target may be the boundary between a liquid and a gas or between two or more liquids to measure the depth of one or more of the liquids. The liquid may be flowing within a channel, for example, a river or may be non-flowing, in a natural basin or within a tank. Typically in such systems, the signal is an ultrasonic signal using a submerged ultrasonic sensor or the sensor may be fixed to a rigid structure in air above a target surface, looking down on the target. In a further prior art arrangement, a fixed submerged sensor is mounted to a structure such as a bridge and utilized to monitor a distance from the sensor to the surface of, for example, a river bed. Variations in distance imply that either the bridge is shifting or that the bridge foundations are being eroded.

Such prior art devices determine the value relating to the primary echo. This is achieved by measuring the time elapsed between applying an electronic stimulus to the transmitting element and the detection of the first reflected electronic echo signal from the receiving element. This measurement contains delays not related to the pulse travel time through the liquid due to the delay between the stimulus to the transmitting element and the actual transmission of a signal and the time travelled within the sensor until it reaches its surface before being directed towards the target. Similarly there is a delay between the signal reaching the sensor surface and travelling to the receiving element and then the detection of the echo signal from the receiving element. These delays which may vary with operating conditions have to be removed by calibration. This can lead to either expensive calibration or errors in the system. The primary echo can be confused by spurious echoes from materials within the liquid, by missing echoes and when the primary echo falls within the blanking period (to be discussed later). This can cause unnecessary errors.

SUMMARY OF THE INVENTION

According to a first aspect of the invention, there is provided a method for measuring a distance between a sensor surface and a target, the method comprising:

stimulating a pulse transmitter to transmit a pulse signal from a sensor surface towards a target;

sensing an echo reflected from the target to the sensor and received by a pulse receiver to generate a first pulse received signal;

sensing at least a further echo reflected at least once from the sensor surface to generate a second pulse received signal and determining the time delay between the first and second pulse received signals to give a value proportional to the time taken for the pulse to travel from the sensor surface to the target and thus the distance between the sensor surface and the target.

Neither of these echoes need be the primary echo (i.e. the first echo generated when the pulse travels from transmitter to target and back), but may in fact be second, third, fourth echoes etc. generated as a result of secondary reflections between target and the sensor surface.

According to a second aspect of the invention, there is provided apparatus for measuring the distance between a sensor surface and a target, the apparatus comprising:

a pulse transmitter arranged on receiving a stimulate transmission signal to transmit a pulse signal from the sensor surface towards the target;

a pulse receiver arranged to sense echoes of the pulse received at the sensor surface and generate pulse received signals; and, control means coupled to each of the transmitter and the receiver, wherein the apparatus is operable to stimulate the pulse transmitter to transmit a pulse signal, to receive a first pulse received signal from the receiver when an echo is received at the receiver and a second pulse received signal from the receiver when a further echo is received at the receiver, and on the basis of the delay between the first and second pulse received signals to generate a value proportional to the time travelled between the sensor surface and the target, from which the distance travelled can be calculated.

A primary echo signal is, as explained previously, the one generated by a signal which has travelled through the sensor body into the transmission medium, been reflected at the target and then passed back through the medium and the sensor body to the receiving element, Other echo signals occur because some of the pulse energy arriving back at the sensor is reflected back once more into the medium and undergoes a second reflection at the target before returning to the sensor and so on, further echoes occurring as the ultrasound pulse makes multiple transits between the sensor and the target until the pulse energy is dissipated by attenuation and dispersion. In preferred embodiments a plurality of such further echoes are detected.

Figure 3:
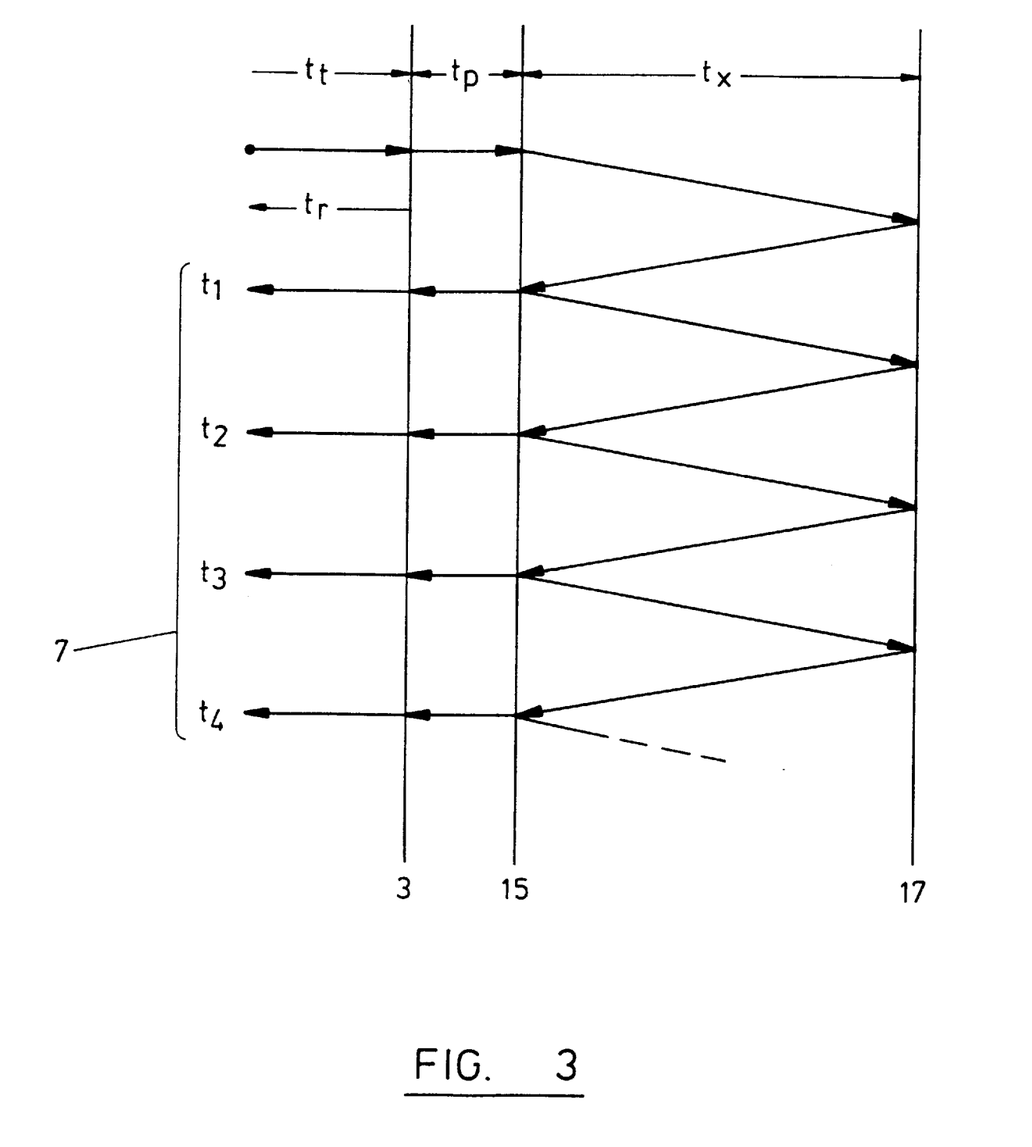
FIG. 3 is a schematic breakdown of the composition of a pulse signal.

By using one or more of these further echoes, time delays due to delays in pulse propagation caused by the delay between the stimulate transmission signal being supplied to the transmitter element and the generation of the pulse, the delay due to the time taken for the wave to propagate through the sensors body and the delay between the receipt of the reflected pulse and the generation of the pulse received signal can all be eliminated. This can be seen in more detail if FIG. 3 of the accompanying drawings is referred to, in which:

$t_t$ is the time delay between applying a stimulate transmission electronic signal to the transmitter element and the generation of a pulse $t_p$ is the time for the pulse to propagate through the sensor body $t_x$ is the time for the wave to travel from the sensor surface to the target and $t_r$ is the time delay between pulse arriving at the receiving element and the generation of a pulse received electronic signal.

In algebraic form the arrival times for a primary echo, $t_1$, and echoes $t_2, t_3, t_4 \ldots t_n$ are given below $$t_1 = t_t + t_r + 2 \cdot t_p + 2 \cdot t_x \tag{1}$$

$$t_2 = t_t + t_r + 2 \cdot t_p + 4 \cdot t_x \quad (2)$$

$$t_3 = t_t + t_r + 2 \cdot t_p + 6 \cdot t_x \quad (3)$$

$$t_4 = t_t + t_r + 2 \cdot t_p + 8 \cdot t_x \text{ etc} \quad (4)$$

More generally the $n_{th}$ echo occurs at time $t_n$ given by $$t_n = t_t + t_r + 2 \cdot t_p + 2n \cdot t_x \quad (5)$$

From FIG. 3 and the above equations, it is clear that the echo sequence is periodic and that the periodic interval (i.e the time interval between the echoes at $t_n$ and $t_{n+1}$) depends only on the travel time between the sensor surface and the target. By using the present invention, differences between the arrival times of the echo components are measured since each component is subject to the same unknown delays $t_t$, $t_p$, $t_r$. The effect of the differencing process is to remove these unknown values. So that, for a $Z^{th}$ echo and $Y^{th}$ echo (Z>Y) the time $2t_x$ for a pulse to travel from sensor surface to target and back is given by:

$$\frac{t_Z - t_Y}{(Z - Y)} \quad (6)$$

The invention encompasses a range of methods for determining the periodic interval of the echo signal. This contrasts with traditional pulse echo systems of the prior art in which only the time $t_1$ to receive the primary echo signal is measured and all other echoes are ignored.

Traditional pulse echo systems make one time delay measurement for each pulse transmitted. The method in accordance with the invention makes a number of delay measurements per pulse. This means that the longer total time delay is measured and divided by the number of echo intervals which results in an effective improvement in resolution.

Traditional pulse echo systems can be confused by spurious echoes from materials within the liquid and by missing echoes when the primary echo falls within the blanking period (to be discussed hereinbelow). The invention gives access to several simultaneous measurements of the pulse travel time which may be cross checked to validate the pulse echo signal. In simplest form, an echo signal giving n time measurements $t_1$ to $t_n$ provides n-1 first differences which are each utilisable to give an estimate of the pulse travel time. Checking that all n-1 values differ by less than some predetermined limit, for example, a few microseconds gives a criterion by which the pulse echo signal may be accepted or rejected. Pulses which give an estimate of travel time clearly too short in comparison to other estimates are rejected as a system fault or, for example, as being due to spurious reflections, such as may be generated by extraneous material passing between sensor and target, and undue delays between received echoes giving clearly too long an estimate of travel time may indicate that a reflection or pulse is "missing". In such a manner, the apparatus and method may perform powerful self-diagnostic checks. Furthermore, once an echo has been verified in the above manner the different estimates of travel time may be averaged to give a more precise estimate of travel time and hence distance between sensor surface and target.

Use of the method and apparatus in accordance with the present invention gives a further advantage in that the system overcomes a problem which arises with traditional pulse echo measurement systems. A typical pulse echo signal consists of a feed-through signal, a primary echo at time $t_1$ and a sequence of secondary echoes of decreasing magnitude at further times $t_2$, $t_3$, $t_4$ etc. The feed through signal occurs when there is a direct path between the elements which transmit and receive the signal which may often be physically the same component. This is sometimes removed by the process of blanking, i.e. forcing the received signal level to zero until a certain time $t_b$ has elapsed after the pulse transmission.

The blanking time means that there is a time following pulse transmission in which echoes cannot be received. This limits the minimum distance that can be measured by traditional systems which can only operate when $t_1 > t_b$. For submerged ultrasonic systems, this limiting value is typically 50–100 mm. However, use of the method in accordance with the present invention avoids the problems caused by blanking since further echoes arriving after the blanking time are processed. The minimum distance that can be measured by particular apparatus is limited only by the ability of the receiver and controller to discriminate between the arrival of each echo. In practice, depth measurement down to less than 10 mm can be achieved.

The invention is applicable with particular advantage to systems for measuring the depth of a liquid. The sensor may be arranged at the bottom of the body of liquid, for example on a river bed with the sensor's surface facing upwards towards the upper surface of the liquid which in this case is the target. Alternatively, the sensor may be mounted in the air above the liquid facing downwards towards the upper surface of the liquid which is the target. Waves directed towards the surface of the liquid will be reflected at the surface. Alternatively, the sensor could be mounted at or below the liquid surface (for example floating on the surface) and directed towards the base of a vessel or river bed so that the base becomes the target.

The sensor may be arranged within a stabilizing tube extending from the sensor surface to the target so that the ultrasound or other wave path is confined but the system also works with an unconfined path. The use of a stabilizing tube may damp movement of the surface of the liquid but problems can occur when the liquid includes any solids which can become entrained in the perforations into the stabilizing tube. Preferably the stabilizing tube includes at its upper surface at least one aperture which can be used to control the flow rate of air from the stabilizing tube, and hence liquid into the stabilizing tube and this reduces the flow of solids into the stabilizing tube. Alternatively, flow rate can be regulated by an aperture at the bottom surface of the stabilizing tube.

The control means which may be a microprocessor may be programmed to calculate the volume of liquid within a vessel or alternatively may be programmed for use in connection with a weir, or flume, or similar device to monitor the flow rate of liquid within a channel.

Preferably the sensor includes means for measuring the temperature of the liquid, and the microprocessor receives this signal to calculate the waves (pulse) velocity within the liquid. This is because the speed of travel of the wave within the liquid will be dependent on the temperature. In this case, the apparatus may include display means for displaying the temperature.

The signals output by the microprocessor may be frequency, voltage, current, or serial or parallel digital outputs according to the use to be made of them. The signals can be used to record, calculate or display depth and/or temperature measurements or any other parameter derivable therefrom or to control other apparatus dependant on such parameters. For example, the signal may be fed to pumps for correcting the liquid level.

The sensor surface may be shaped to focus echoes and maximise the number of echo signals which may be processed.

Preferably the microprocessor is programmed to process the echo delays in one of a number of mathematical calculations to ensure the most accurate measurement of the distance. Such methods are described in more detail in connection with the accompanying drawings. However, it will be apparent to the skilled addressee of the specification that there are other methods of processing the time delay signals to calculate the distance.

DESCRIPTION OF THE DRAWINGS

A method and apparatus of pulse echo distance measurement will now be described, by way of example only with reference to the accompanying drawings, in which.

DETAILED DESCRIPTION OF THE PREFERRED EMBODIMENTS

Figure 1:
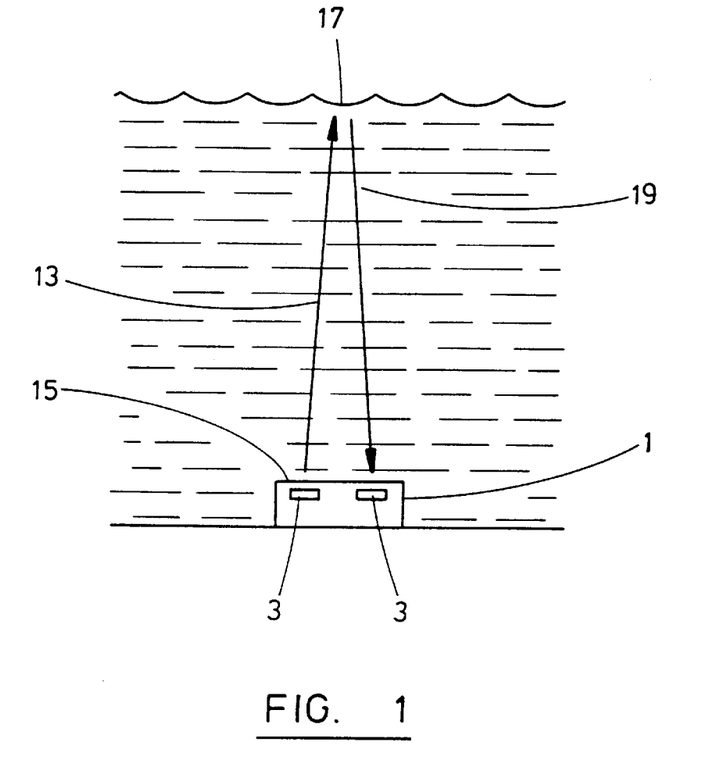
FIG. 1 is a schematic view of a submerged sensor used for liquid depth measurement.
Figure 7:
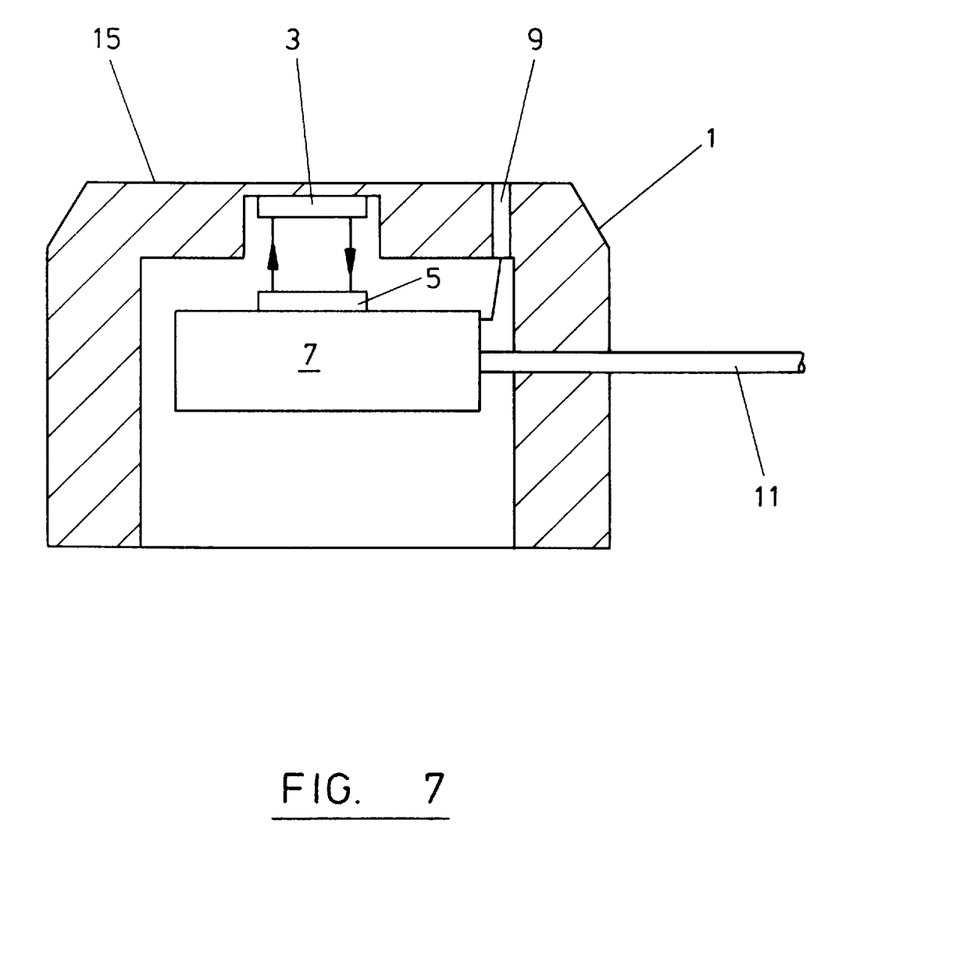
FIG. 7 is a schematic section through a depth sensor in accordance with the invention.

The present apparatus is shown schematically in FIG. 1 and FIG. 7 and is one which operates using ultrasound pulses. The apparatus comprises a sensor 1 having mounted within it a piezoelectric crystal 3 which is operable to transmit and receive ultrasound pulses. Although FIG. 1 appears to show two piezoelectric crystals 3, this is for aiding clarity of that illustration and, in practice, usually only one crystal 3 as shown in FIG. 7 is required and this acts as transmitter and receiver. The piezoelectric crystal is coupled via interface circuit 5 to microprocessor control 7. A pulse transmit signal is generated by microprocessor 7 via interface 5 to piezoelectric crystal 3 to radiate a short pulse of ultrasound of a few micro seconds. Primary and secondary echo signals are received by the crystal 3 and are fed via interface signal 5 to the microprocessor which is programmed to detect and record the arrival of each component of the echo sequence with a timing resolution of one micro second.

The sensor also includes a temperature sensor 9 coupled to the microprocessor 7 to measure the liquid temperature from which it determines the ultrasound propagation velocity by means of a look up table stored in memory (not shown).

Microprocessor 7 is coupled to a power input via cable 11 which also is used to transmit an output signal.

In use the sensor 1 is placed at the base of the body of the liquid. The microprocessor 7 stimulates the crystal to transmit an ultrasonic pulse 13 from the sensor surface 15 towards target 17 which in this case is the boundary between the liquid and the air above it. At the boundary a pulse 19 is reflected towards the crystal 3.

Figure 2:
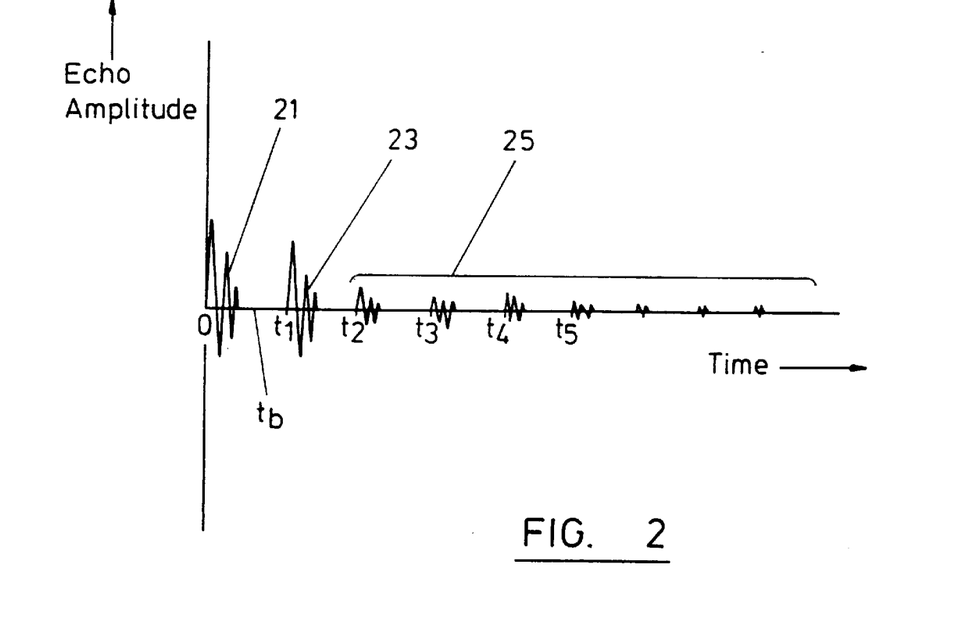
FIG. 2 is a graph of echo amplitude against time, for a typical pulse echo signal.

A typical pulse echo signal is illustrated in FIG. 2. Given that the crystal 3 acts as both a transmitter and receiver of the ultrasound, a feed-through signal 21 occurs at transmission. Primary echo signal 23 is generated by ultrasound which has travelled through the sensor body to surface 15 into the liquid being reflected at the liquid surface and then passed through the liquid and the probe body to the receiving element. The secondary echo signals 25 occur because some of the pulse energy arriving at the sensor surface 15 is reflected back into the liquid and undergoes a further reflection at the liquid surface 17 before returning to the sensor 1. Further echoes at $t_3$, $t_4$ etc occur as the ultrasound pulse makes multiple transits between the sensor and the liquid surface 17 until the pulse energy is dissipated by attenuation and dispersion. The composition of the ultrasound path associated with the primary and secondary echo signals is illustrated schematically in FIG. 3 which has already been discussed in relation to equations (1) to (6). In terms of the different parameters $t_t$, $t_p$, $t_x$ and $t_r$ of those equations, these relate as follows to the specific embodiment of FIG. 7:

$t_t$ is the time delay between the microprocessor 7 transmitting an electronic signal to the transmitter element 3 and the generation of ultrasound by the crystal 3;

$t_p$ is the time for the ultrasound to propagate through the sensor body towards sensor surface 15;

$t_x$ is the time for the ultrasound to travel from the sensor surface 15 to the liquid surface 17 (and also for the time taken to travel from the liquid surface 17 back to the sensor surface 15); and, $t_r$ is the time delay between the ultrasound arriving at crystal 3 and the generation of a signal received by microprocessor 7.

As mentioned previously, it is clear that the echo sequence is periodic and that the periodic interval, i.e. the time interval between the echoes $t_i$ and $t_i+1$ depends only on the pulse travel time between the sensor surface 15 and the liquid surface 17 and on none of the other factors affecting $t_t$, $t_r$ and $t_p$. There are a number of ways of processing the sequence of echo arrival times recorded by the micro-processor in order to determine the pulse travel time and to verify this measurement.

An echo signal yielding a sequence of n arrival time measurements ($s_1$ to $s_n$) provides n–1 first differences (i.e. $s_2-s_1$, $s_3-s_2$, etc.) which are each estimates of the pulse travel time. Taking the mean of these differences gives the pulse travel time from the sensor to the target and back. This is numerically equal to calculating $$\frac{S_n - S_1}{n-1} \tag{7}$$

By testing all of the individual differences to ascertain that each is within a small interval of the mean value, typically a few microseconds, the reliability of the measurement may be confirmed.

Figure 4:
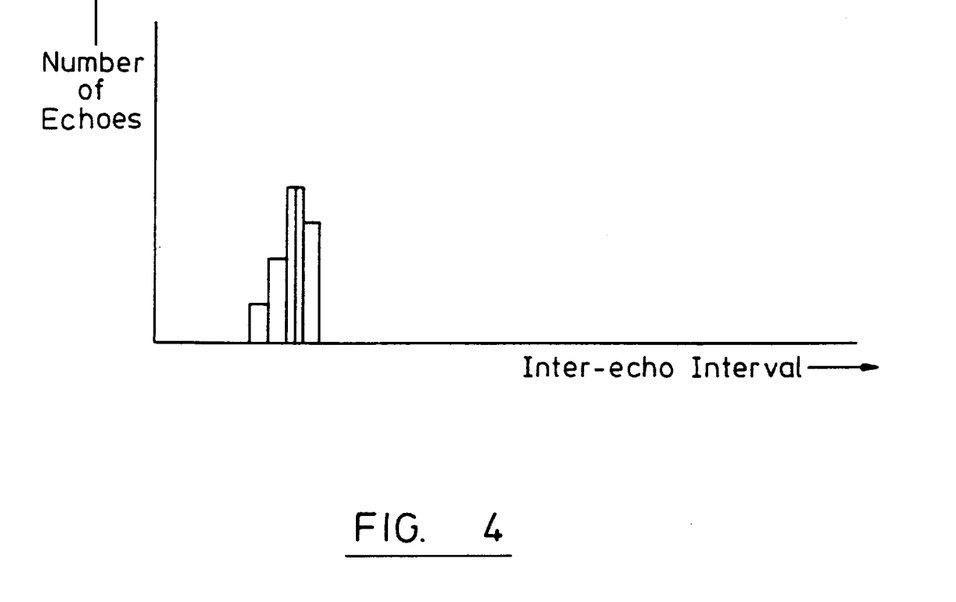
FIG. 4 is an echo interval histogram of number of echoes against inter-echo interval.
Figure 5:
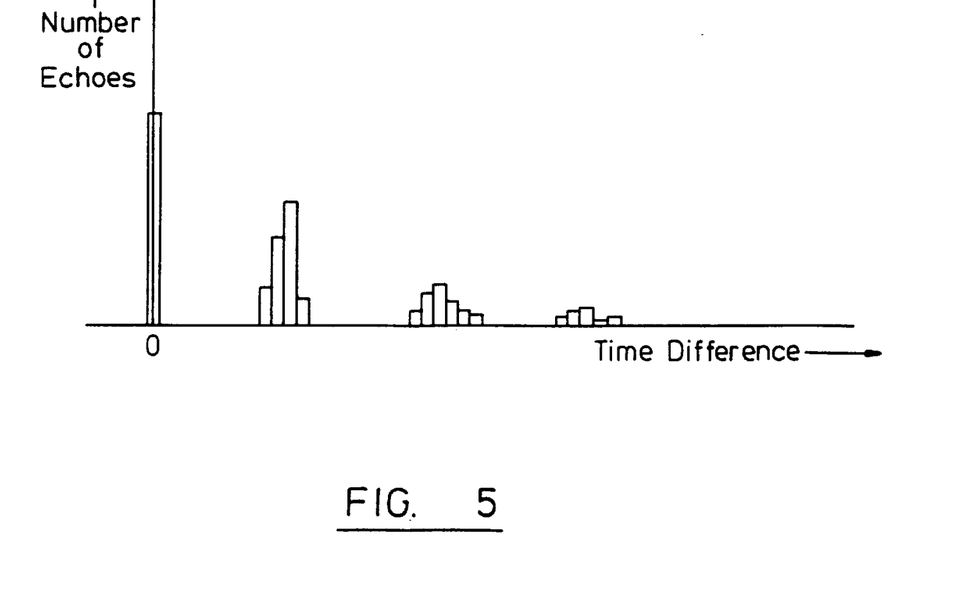
FIG. 5 is a graph of echo signal auto-correlation of number of echoes against time difference.

Alternatively, the n–1 first differences may be plotted to form a histogram as in FIG. 4. This histogram may contain data from a single pulse echo signal or may be the accumulation of data from several pulse echoes. The position of the peak of this histogram is the required pulse travel time. This peak position may be obtained by numeric techniques or by analytical means. The height of the histogram peak above any baseline noise gives an indication of the reliability of the pulse travel time measurement.

Alternatively, the echo interval histogram of FIG. 4 may be extended to include higher differences (i.e. $s_{i+2}-s_i$, $s_{i+3}-s_i$ etc). The resulting histogram is the positive half of the symmetrical auto-correlation function. This function has a comb like structure as shown in FIG. 4 from which the pulse travel time may be determined either directly or by techniques such as Fourier analysis.

Figure 6:
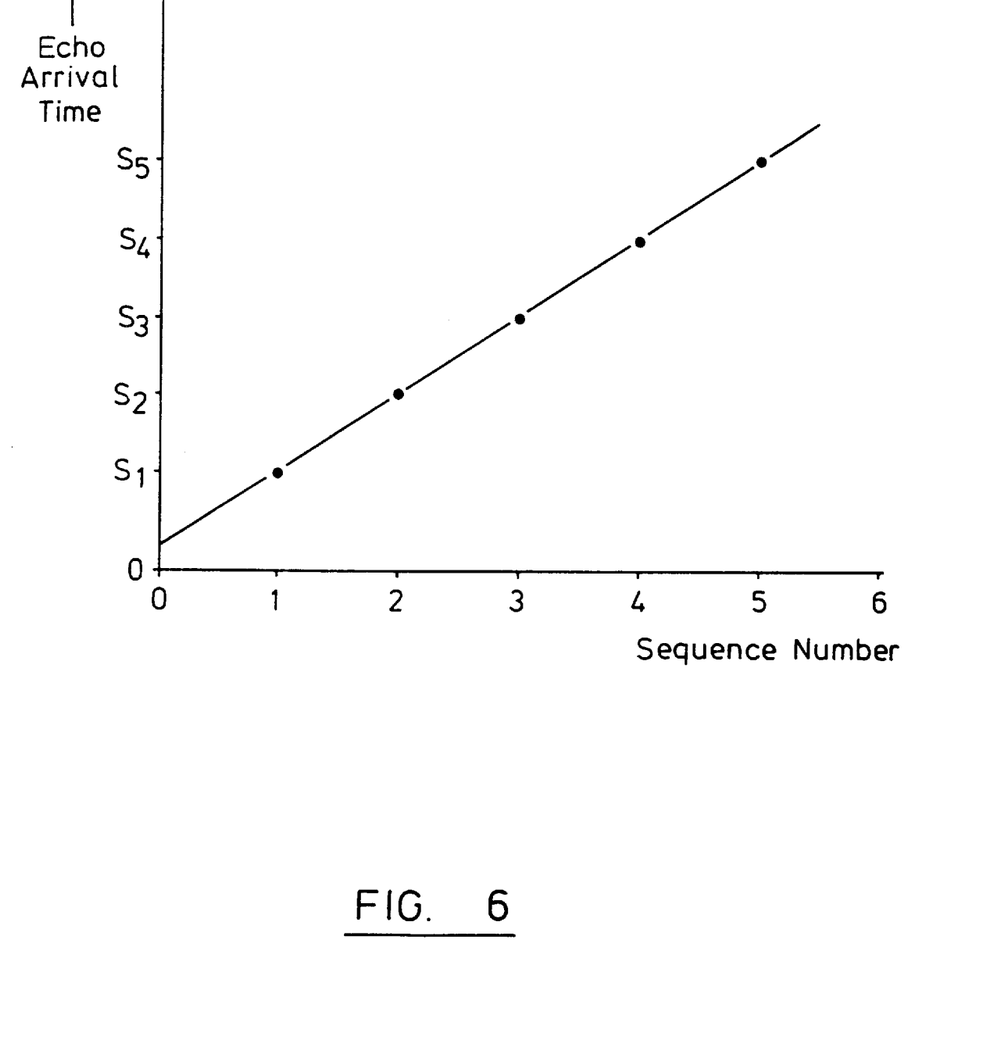
FIG. 6 is a graph of echo arrival time against echo number.

However, the most effective method of calculating the pulse travel time from the sequence of echo arrival times $s_1, s_2, \ldots s_n$ is by linear regression. Plotting each echo arrival time $s_i$ against i gives in the ideal case a set of points on a straight line of slope $2 \cdot t_x$ as shown in FIG. 6. If the first echo arrival time $s_1$ corresponds to the primary echo it is easy to show that the best straight line fit (least square error) to the data has a slope given by $$\frac{n \cdot q - a \cdot p}{(n \cdot b - a^2)} \tag{8}$$

and the intercept with the echo arrival time axis occurs at $$\frac{b \cdot q - a \cdot q}{(n \cdot b - a^2)} \tag{9}$$

where $$a = \sum_{i=1}^{n} i \tag{10}$$

$$b = \sum_{i=1}^{n} i^2 \tag{11}$$

$$p = \sum_{i=1}^{n} s_i \tag{12}$$

and $$q = \sum_{i=1}^{n} i \cdot s_i \tag{13}$$

The microprocessor is programmed to use this method to calculate the slope value which is the best estimate of the time interval between successive echoes—the pulse travel time. The position of the intercept with the echo arrival time axis which should occur at $t_t + t_r + 2 \cdot t_p$ is used for echo signal verification. When this intercept occurs at an implausible value, i.e. less than zero or greater than a few microseconds, the signal is discarded. Otherwise the calculated slope is taken as a measure of the pulse travel time. Alternatively, the mean square deviation of the points from the best fit straight line can be used as the parameter by which the sequence is accepted or rejected.

In the case where it cannot be guaranteed that the first echo arrival time $s_1$ corresponds to the primary echo it is possible to modify the echo arrival time sequence by subtracting $s_1$ from each element of the sequence and removing the first (zero) item (i.e. $s_2 - s_1$ becomes $s_1$, $s_3 - s_1$ becomes $s_2$, $s_4 - s_1$ becomes $s_3$, etc.). The micro-processor then uses the above procedure to calculate the best estimates of the slope and the intercept, which should now occur at an echo arrival time of zero. The measurement is accepted only if the calculated intercept is within a few microseconds of zero. Otherwise the sequence is discarded.

Multiplying the pulse travel time by the ultrasound velocity gives the depth measurement. Several such measurements are averaged to produce the final depth measurement which is output by the microprocessor as a frequency signal suitable for input to a data logger.

Experimental data showed that depth measurements from 10 mm to 5 metres are possible with systematic errors within 0.2% of reading. This superior to the performance of pressure sensors which are at present widely used. The ultrasonic system is significantly better than pressure sensors at low depths and has a comparable performance to systems using float, counterweight and shaft encoder.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A method for measuring a distance between a sensor surface and a target, the method comprising the steps of:
   stimulating a pulse transmitter to transmit a pulse signal from the sensor surface towards the target; and
   sensing a plurality of echoes, said plurality of echoes comprising a) an echo reflected from the target to the sensor and received by a pulse receiver to generate a pulse received signal at a corresponding echo arrival time and b) an echo reflected at least once from the sensor surface to generate a further pulse received signal with a respective arrival time; and
   determining the time delay between the pulse received signals to therein give a value proportional to the time taken for the pulse to travel from the sensor surface to the target and, a distance between the sensor surface and the target,
   wherein an arrival time, $t_n$ of an echo corresponding to that of a transmitted pulse which is being reflected n times by the target is given by the following equation:

$$t_n = t_t + t_r + 2 \cdot t_p + 2n \cdot t_x$$

where, $t_t$ represents a time delay between applying a stimulate transmission electronic signal to a transmitter and the generation of a pulse, $t_p$ represents the time taken for the pulse to propagate through a sensor body, $t_x$ the time taken for the pulse to travel from a sensor surface to the target and $t_r$ represents the time delay between a pulse arriving at the receiving element and the generation of a pulse received signal.

2. A method according to claim 1, wherein a plurality of further echoes are detected.

3. A method according to claim 2, wherein arrival times of the plurality of further echoes are measured.

4. A method according to claim 1, wherein the time, $2t_x$ taken for a pulse to travel from the sensor surface to the target and back based on a zth echo and yth echo is given by:

$$2t_x = \frac{t_z - t_y}{(z - y)} .$$

5. A method according to claim 1, wherein a plurality of arrival times are measured and the pulses travel time are calculated from the sequence of measured echo arrival times by linear regression.

6. A method according to claim 1, wherein a plurality of time delays between pulse received signals are determined and the multiple values calculated for the travel time compared and, wherein, a result of the comparisons is used to carry out self-diagnostic checking.

7. The method according to claim 5, wherein said pulse travel time $2t_x$ is given by a slope of a line obtained during said linear regressing process and an intercept of said line with the echo arrival time access is used to provide a self-diagnostic function wherein when said intercept corresponds to an implausible value, the calculated pulse travel time to $t_x$ is rejected.

8. Apparatus for measuring the distance between a sensor surface and a target, the apparatus comprising:

a pulse transmitter arranged on receiving a stimulate transmission signal to transmit a pulse signal from the sensor surface towards the target;

a pulse receiver arranged to sense echoes of the pulse received at the sensor surface and generate pulse received signals; and control means coupled to each of the transmitter and the receiver, wherein said pulse receiver senses a plurality of echoes, said plurality of echoes comprising an echo reflected from the target to the sensor and received by said pulse receiver to generate a pulse received signal at a corresponding echo arrival time and an echo reflected at least once from the sensor surface to generate a further pulse received signal with a respective arrival time and said control means for determining the time delay between the pulse received signals to give a value proportional to the time taken for the pulse to travel from the sensor service to the target and, a distance between the sensor surface and the target, wherein an arrival time, $t_n$ of an echo corresponding to that of a transmitted pulse which is being reflected n times by the target is given by the following equation:

$$t_n = t_t + t_r + 2 \cdot t_p + 2n \cdot t_x$$

where, $t_t$ represents a time delay between applying a stimulate transmission electronic signal to the pulse transmitter and the generation of a pulse, $t_p$ represents the time taken for the pulse to propagate through a sensor body, $t_x$ the time taken for the pulse to travel from a sensor surface to the target and $t_r$ represents the time delay between a pulse arriving at the receiving element and the generation of a pulse received signal.

9. Apparatus according to claim 8, wherein the pulse transmitter and the pulse receiver form part of a single component.

10. Apparatus according to claim 8, wherein the sensor is provided with a stabilizing tube extending from the sensor surface to the target so that a path of the pulse is confined, said stabilizing tube including at least one aperture which can be used to control the flow rate of air or liquid from the stabilizing tube.

* * * * *